(12) United States Patent
Poltorak

(10) Patent No.: US 8,088,278 B2
(45) Date of Patent: Jan. 3, 2012

(54) WASTEWATER FILTERING MEDIUM

(76) Inventor: David Poltorak, Langley (CA)

( * ) Notice: Subject to any disclaimer, the term of this patent is extended or adjusted under 35 U.S.C. 154(b) by 486 days.

(21) Appl. No.: 12/259,207

(22) Filed: Oct. 27, 2008

(65) Prior Publication Data

US 2010/0101994 A1    Apr. 29, 2010

(51) Int. Cl.
*C02F 3/10* (2006.01)
(52) U.S. Cl. .................. 210/150; 261/DIG. 72; 428/402
(58) Field of Classification Search .................. 210/150, 210/151; 261/94, DIG. 72; 428/402
See application file for complete search history.

(56) References Cited

U.S. PATENT DOCUMENTS

| | | | |
|---|---|---|---|
| 3,506,248 A * | 4/1970 | Starbuck et al. | 261/DIG. 72 |
| 3,882,027 A * | 5/1975 | Lunt | 210/150 |
| 3,957,931 A * | 5/1976 | Ellis et al. | 210/150 |
| 4,122,011 A * | 10/1978 | Strigle, Jr. | 210/150 |
| 4,385,988 A * | 5/1983 | Hypponen | 261/94 |
| 4,997,568 A * | 3/1991 | Vandervelde et al. | 210/150 |
| 5,543,039 A * | 8/1996 | Odegaard | 210/150 |
| 5,632,896 A * | 5/1997 | Vandervelde et al. | 210/617 |
| 6,126,829 A * | 10/2000 | Gunnarsson et al. | 210/150 |
| 6,685,826 B1 * | 2/2004 | James | 210/150 |
| 7,081,203 B2 * | 7/2006 | Helm | 210/150 |
| 2004/0182762 A1 * | 9/2004 | Sonego | 210/150 |

* cited by examiner

*Primary Examiner* — Christopher Upton
(74) *Attorney, Agent, or Firm* — C. Larry Kyle; Nexus Law Group LLP

(57) ABSTRACT

A secondary wastewater treatment filtering bed medium, which includes a hollow tubular plastic body and a plurality of elongated ribs affixed to an outer surface of the body aligned with an axis of the body.

5 Claims, 3 Drawing Sheets

WASTEWATER FILTERING MEDIUM

FIELD

The present invention relates to an improved filtering medium for the removal of solids from waste water.

BACKGROUND

In areas where municipal treatment of wastewater is unavailable, septic tank systems are usually relied upon. In a typical septic system, raw sewage containing a significant concentration of waste solids, enters one end of an in-ground tank and discharges at a discharge end of the tank. In the tank, solids separate from the liquid in the waste water. Solids in the form of scum collect on the surface while solids more dense than the liquid sink to the bottom as a sludge. The liquid between the surface and the sludge which is relatively clear, exits the discharge end of the tank.

The condition of the effluent from the septic tank determines the appropriate secondary treatment. This condition is measured by the biochemical oxygen demand (BOD), total suspended solids (TSS) and total nitrogen present in the effluent. The BOD and local nitrogen concentrations of the septic tank effluent primarily determine the size and kind of the secondary waste treatment facilities. Decomposition of organic material by bacteria present in the anaerobic environment of a septic tank changes the organic nitrogen to ammonia nitrogen. Thus, the septic tank effluent contains nitrogen primarily as ammonia nitrate. An aerobic treatment which typically occurs in the secondary treatment reduces BOD and TSS to acceptable levels prior to discharge of the secondary effluent. In this treatment bacteria oxidize ammonia nitrogen to nitrate nitrogen. Thus, in conventionally treated septic tank effluent nitrogen is present primarily as ammonia nitrogen. In an aerobic environment, such as in secondary treatment, the bacteria oxidize ammonia nitrogen to nitrate nitrogen.

Vandervelde et al. in U.S. Pat. Nos. 4,997,568 and 5,632,896 discloses a system of treating septic tank effluent which consists of infusing the effluent at extremely low velocities through a plurality of precisely graded progressively finer pored media, starting with a larger interface area and reaction volume and then with smaller average interstitial distance, and increasingly more intimate contact between biota and pollutants. A progressive treatment is achieved by shaping the reactor in a cylinder, wedge or cone shape with the largest pored media at the center or apex where the effluent is introduced. The effluent then seeps radially to the periphery while being purified. Contact with ambient air can be maximized by shaping the filter bed to have a large air-effluent interface.

One can use coarse gravel in the lower filter beds or even open cell foam plastic or other porous materials. It is also known to use short sections of pipe randomly oriented in place of the coarse gravel. The purpose of the parts in the filtering media is to provide a surface to which microorganisms can attach and function to react with the effluent. Fabco Plastics of Maple, Ontario manufactures and sells short sections of plastic saddles with many small openings forming a porous complex part and serrated edges and parts having a short cylindrical structure with large openings and radially spaced, diametrically extending supports. It is not clear that such designs offer a significantly increased surface area for microorganisms to attach to as each opening reduces the surface area by the size of the opening but adds the surface area of the edges around the opening. It is expected that such parts are costly to manufacture by injection molding given their complexity.

Accordingly, it is an object of the invention to provide an improved part for a filtering media. It is a further object to provide a part for a filtering media that has a relatively simple construction so that it is easily injection molded while, at the same time, being inexpensive to produce.

SUMMARY OF THE INVENTION

According to the invention there is provided a secondary wastewater treatment filtering bed medium, which includes a hollow tubular plastic body and a plurality of elongated ribs affixed to an outer surface of the body aligned with an axis of the body;

The medium may include a plurality of elongated ribs affixed to an inner surface of the body, aligned with the axis of the body. The medium may also include a plurality of spaced apart rings around an inner surface of the body.

The elongated ribs are radially spaced apart and the elongated ribs on the inner surface of the body are aligned with respective elongated ribs on the outer surface of the body.

BRIEF DESCRIPTION OF THE DRAWING

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
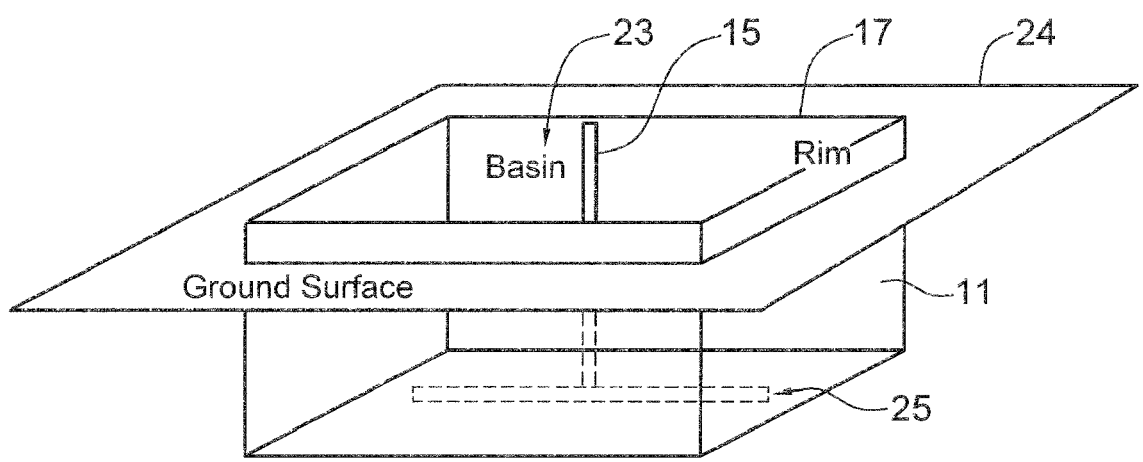
FIG. 1 is a perspective view of a hole for a biofilter.

A hole of rectangular cross-section 23 for a biofiltering bed is shown in FIG. 1. A rim 17 extending above the ground surface 24 encloses the top of the hole 23. A horizontal perforated pipe extends across the bottom of the hole 23 and a vertical stand pipe 15 extends up from the center of the perforated pipe 25 and is in fluid communication with the latter.

Figure 2:
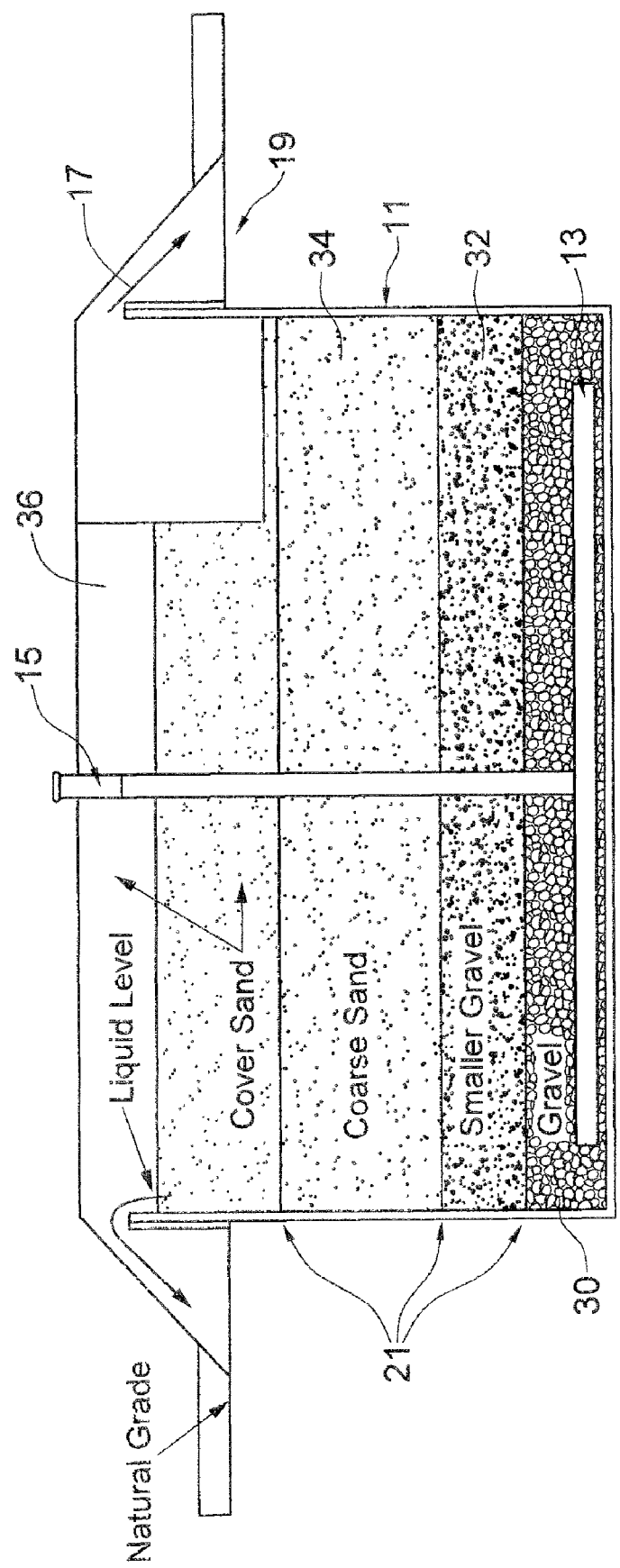
FIG. 2 is a front sectional view of the hole of FIG. 1 showing the layers of granular material.
Figure 3:
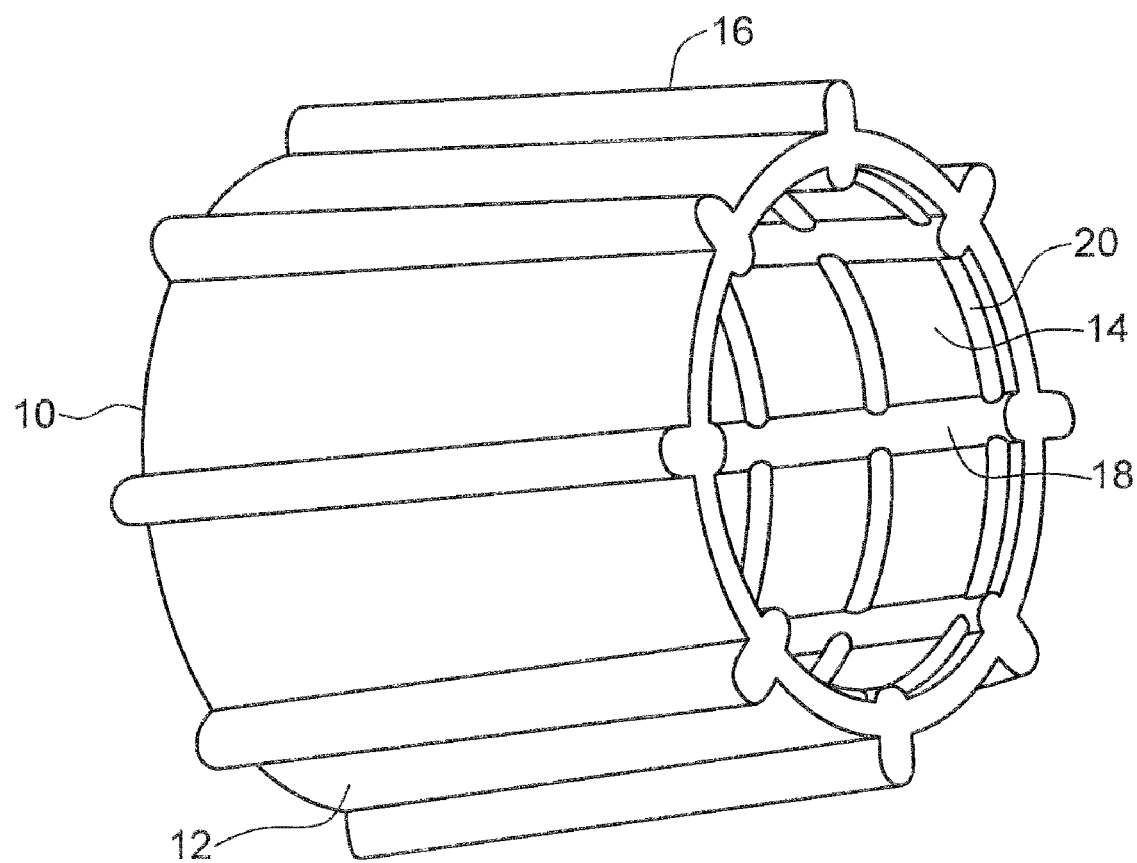
FIG. 3 is a perspective view of the biofilter medium.

As seen in FIG. 2 various granular materials are laid down in layers in the hole beginning with a coarse gravel at the bottom followed by a smaller gravel, coarse sand and then cover sand at the top. Each layer is separated from the next by a screen separator, which prevents mixing of the material in the beds. A containment vessel is formed by placing a 30 mil PVC liner 11 against the sides and bottom of the hole 23, to make it leak tight. The liner 11 extends over the rim 17 down the outside surface of the rim 17. A perforated PVC pipe extends across the bottom of the hole and a PVC standpipe extends centrally and vertically from the perforated pipe to slightly above the surface of a bed of granular material filling the hole. The granular material consists of a bed of coarse gravel 30 at the bottom which covers the perforated pipe 13 followed by successive layers of smaller gravel 32, coarse sand 34, and topped off by a layer of cover sand 36.

Effluent enters the standpipe 15 and flows down to the perforated pipe 13 from which it escapes into the coarse gravel 30 and percolates slowly up to the cover sand 36 where it flows over the rim 17 and out around the surrounding ground 19. As effluent passes through the granular material, microorganisms or bacteria attach to the surface of the granular material, form a fixed film biological growth or slime layer and oxidizes the organic material present in the liquid, thus reducing the BOD. The nitrifying bacteria present in the slime layer converts the ammonia nitrogen present in the liquid to nitrate, nitrogen. (Ammonia nitrogen is produced in the anaerobic environment of the septic tank by bacteria acting on the organic nitrogen). The BOD and suspended solids present in the liquid are also reduced.

The coarse gravel layer 30 is replaced by a layer of plastic pieces 10. Each plastic piece 10 has a tapered outer wall surface 12 and an inner wall surface 14 parallel to the outer wall surface 12. The outer wall surface 12 has a plurality of radially spaced apart outer elongated ribs 16. Inner elongated ribs 18 are aligned with outer elongated ribs 16. Longitudinally spaced apart circular ribs 20 extend along the length of the part 10. The added area of the elongated ribs 16 and 18, and circular ribs 20 is about 70% of the area of the tapered cylindrical surface for the following dimensions:

Height=25.4 mm
Inner D=21.2 mm
Outer D=25.4 mm
Ribs=8×25.4×2 mm
Rings=5×2 mm

Thus, adding the ribs 16 and 18 and rings 20 increases the surface area available for attachment of microorganisms by approximately 70% while not significantly reducing the void volume.

There are two criterion which a complete solid aerobic filter media must meet. Firstly, it must have a large open area or void volume. Secondly, the surface area of the filtering medium must be as high as possible. A large void volume means that effluent can flow into the medium for treatment rather than flowing around the outside of the fluid already there in a phenomenon known as hydraulic shorting. A large surface area provides a large area to which the microorganisms may attach and is preferred so long as it does not substantially reduce the void volume.

Obviously In the above example, it would be possible to increase the surface area even more by increasing the size of the ribs and rings without unduly decreasing the void volume, although the amount of plastic material would increase with a consequent increase in expense.

The improved filtering medium could be used to purify water or any other medium that contains biodegradable materials.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A secondary wastewater treatment filtering bed medium, comprising:
   a hollow tubular plastic body;
   a plurality of elongated ribs affixed to an outer surface of said body aligned with an axis of said body;
   a plurality of elongated ribs affixed to an inner surface of said body, aligned with the axis of said body, said elongated ribs affixed to an inner surface extending inward from said inner surface a first distance; and
   a plurality of spaced apart rings around an inner surface of said body, said spaced apart rings extending inward from said inner surface a distance equal to said first distance.

2. The medium of claim 1, wherein said elongated ribs are radially spaced apart.

3. The medium of claim 2 wherein said elongated ribs on said inner surface of said body are aligned with respective elongated ribs on said outer surface of said body.

4. The medium of claim 1, wherein said elongated ribs on said inner surface of said body are aligned with respective elongated ribs on said outer surface of said body.

5. The medium of claim 4, wherein said elongated ribs affixed to said inner and outer surfaces are equally radially spaced apart.

* * * * *